June 28, 1949.  J. G. FOGARTY  2,474,521
TIRE CHAIN AND MOUNTING DEVICE THEREFOR
Filed July 27, 1945  3 Sheets-Sheet 3
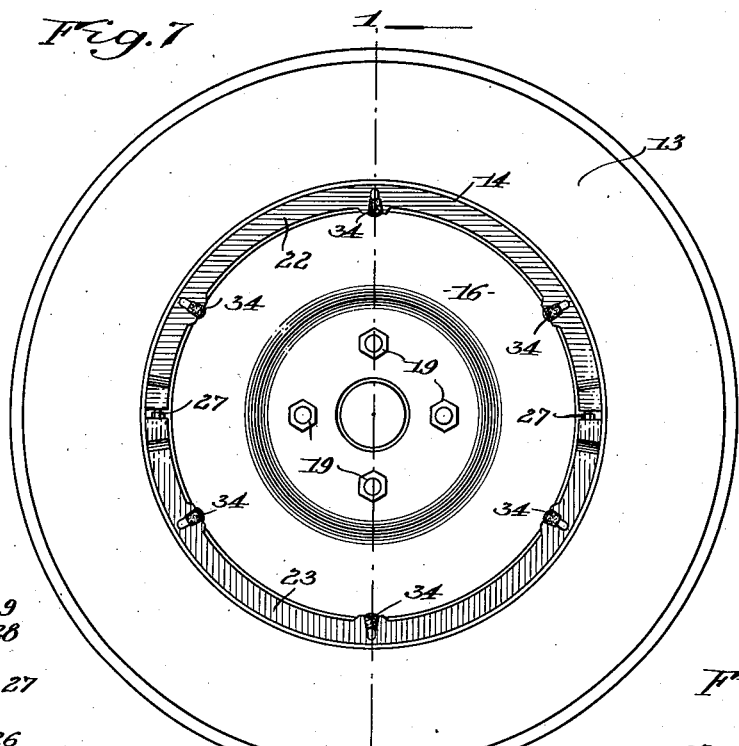
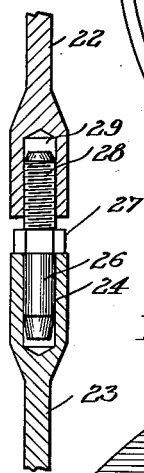
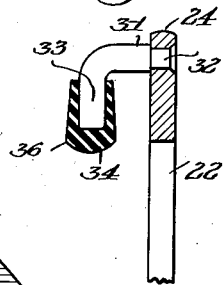
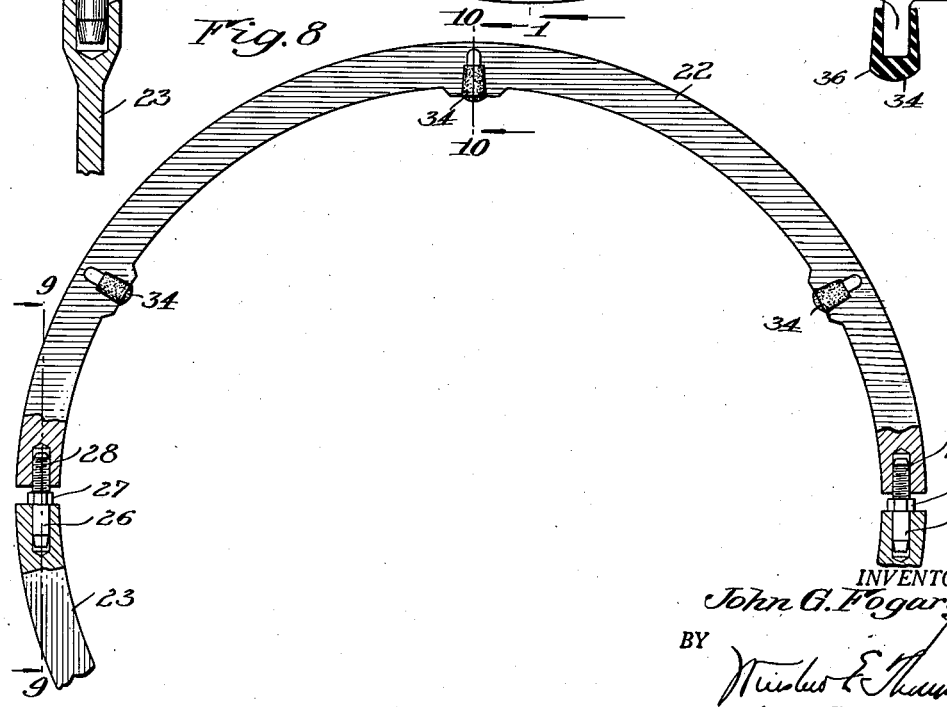
INVENTOR.
John G. Fogarty
BY
his Attorney Patented June 28, 1949

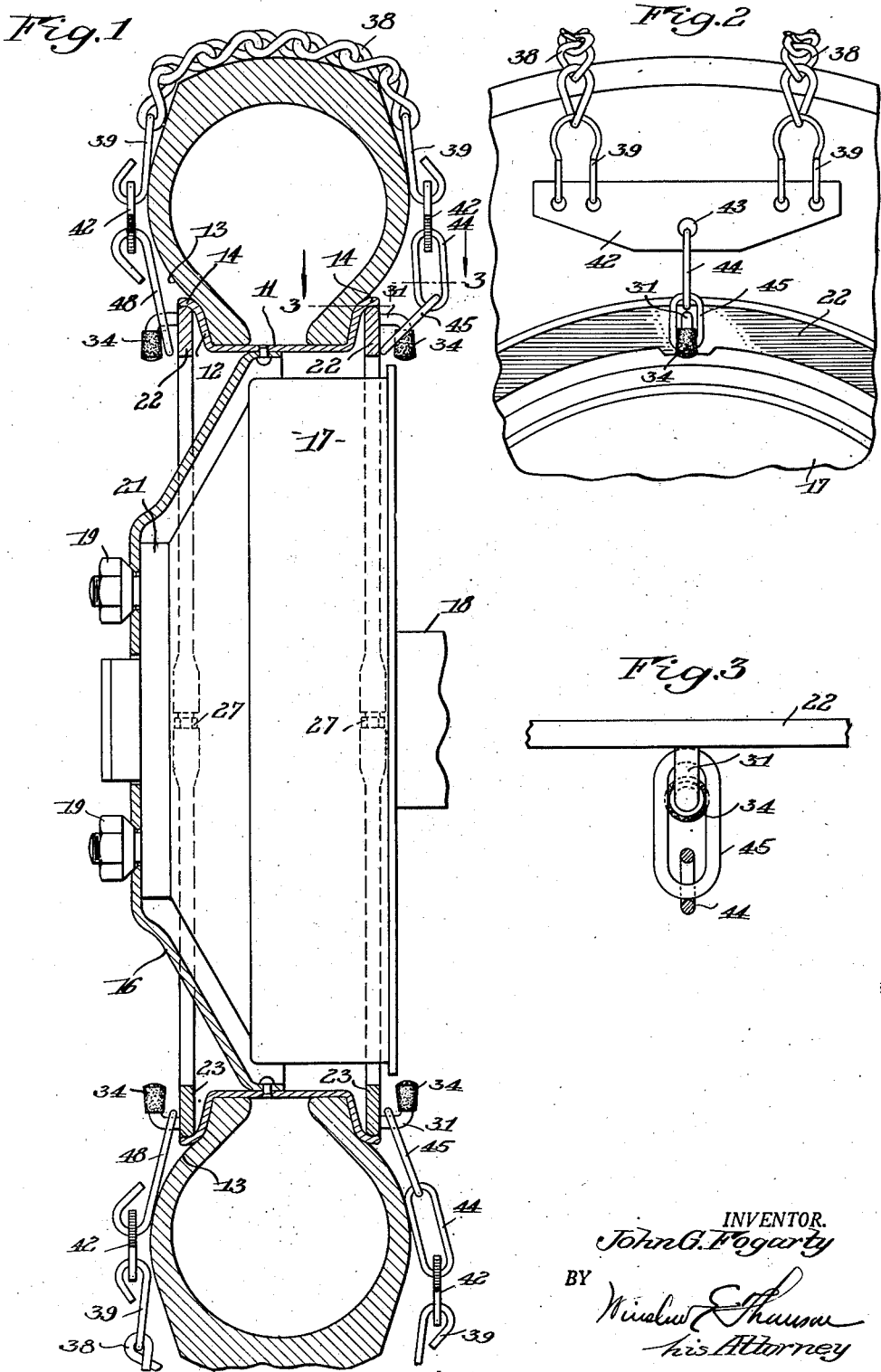

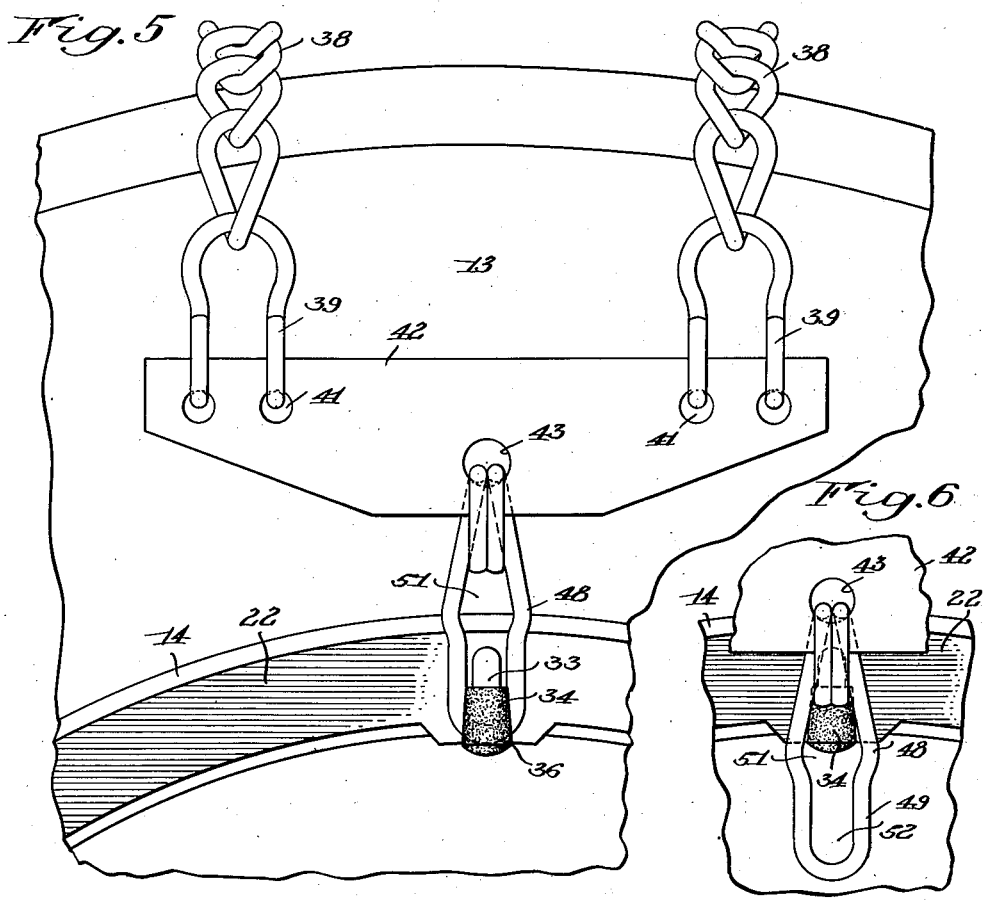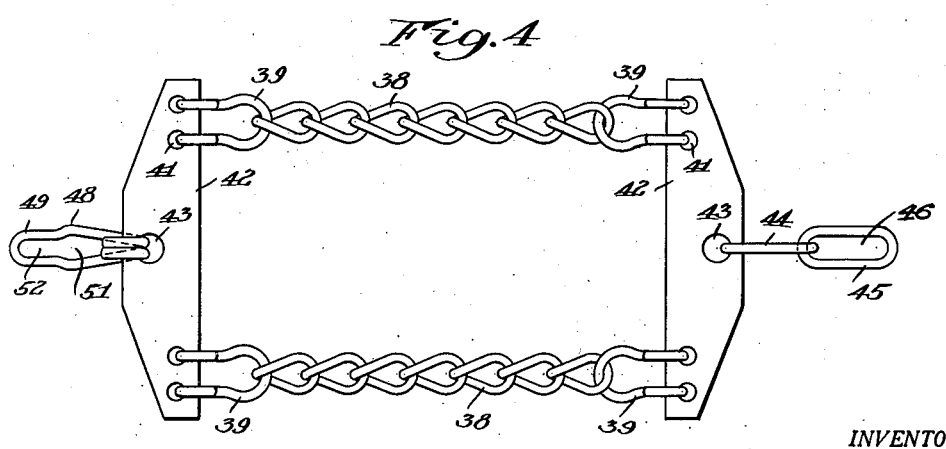

2,474,521

UNITED STATES PATENT OFFICE 2,474,521

TIRE CHAIN AND MOUNTING DEVICE THEREFOR

John G. Fogarty, Rochester, N. Y.

Application July 27, 1945, Serial No. 607,474

6 Claims. (Cl. 152—233)

1

My invention relates to a tire chain and mounting device therefor particularly adapted for use in connection with wheeled vehicles.

An object of my invention is to provide a mounting device for tire chains which may be quickly assembled on the rim of a wheel and is inexpensive to manufacture.

Another object of my invention is to provide a tire chain mounting device which may be easily and quickly mounted on the rim of a wheel and, because of its symmetry of construction, may be left in position when the chains are not in use.

A further object of my invention is to provide a novel mounting device and tire chain assembly so constructed and arranged that the chains may be readily applied to the mounting device without the use of tools and without the necessity of applying unusual physical effort in attaching the chains to the mounting device.

My invention further contemplates the provision of a tire chain assembly and mounting device therefor which may be utilized with commercial types of rims for wheels, either of the single or dual type, and which may be quickly attached to the rim and, if desired, left as a permanent part of the vehicle equipment to which tire chains or other antiskid devices may be quickly and easily attached.

Other objects and advantages of my invention will be apparent from the following description, when taken in connection with the accompanying drawings, in which:

Fig. 1 is a sectional view through a wheel showing the rim, a tire in position on the rim and the tire chains and mounting device therefor of my invention and taken on the line 1—1 of Fig. 7;

Fig. 2 is a vertical side elevation of Fig. 1 looking at the inner side of the wheel;

Fig. 3 is a view taken substantially on the line 3—3 of Fig. 1 in the direction indicated by the arrows;

Fig. 4 is a view of one type of tire chain or antiskid device adapted to be used with the tire chain mounting device of my invention;

Fig. 5 is a side elevation of the outer side of the wheel;

Fig. 6 is an enlarged view of a portion of Fig. 5 showing how the link is threaded over or mounted on the attaching lug;

Fig. 7 is a face view of the tire chain mounting device supported in position on the rim of the tire;

Fig. 8 is a detailed view of a part of the mounting device;

Fig. 9 is a detailed sectional view showing the means for expanding the mounting device against the rim of the wheel; and Fig. 10 is a sectional view taken substantially on the line 10—10 of Fig. 8.

The tire chain mounting device of my invention is adapted to be used in connection with the conventional rim of a wheel which comprises, as shown in Fig. 1, an annular recessed portion 11 which has upturned flanges 12 at each side. The rim is adapted to receive between the upturned flanges, the outer marginal side walls of the tire 13. The flanges 12 are turned outwardly at 14 so as to provide an annular turned portion of the flange extending around the rim.

The wheel may include the usual face plate 16, brake drum 17, axle 18 and stud and nut assemblies 19 for attaching the wheel in position on the wheel support 21.

The mounting device of my invention takes advantage of the annular flange conventionally formed on tire rims for supporting the tire chain mounting device on the rim. The mounting device as shown most clearly in Figs. 7, 8, 9, and 10, comprises two semi-circular rings 22 and 23. These rings may be comparatively light and may be made of steel or other substitute material. Moreover, it is desirable that they be made as symmetrical as possible in order to avoid throwing the wheel out of balance. The outer circumference of each of the semi-circular rings 22 and 23, as shown at 24, is slightly rounded so as to mate with the turned part of the annular flange 14 of the rim.

The ends of one of semi-circular rings is provided with bores 24 which are adapted to loosely receive pins 26. The pins 26 are provided with hexagonal portions 27 adapted to receive a wrench and the other ends 28 of the pins are threaded as shown. The co-operating semi-circular ring element 22 is provided with threaded sockets 29 adapted to receive the threaded ends of the pins 26.

When the device is to be attached to the rim of the wheel, the parts are assembled together in the manner shown in Fig. 8 and placed approximately in the position shown in Fig. 1. A wrench is then applied to the hexagonal portions 27 of the pins 26 and turned in a direction so as to enlarge the gap between the facing ends of the semi-circular rings 22 and 23. This causes an expansion of the ring assembly so as to force the mounting device into engagement with the turned part 14 of the flange of the rim.

An annular mounting device, as described above, is preferably used on both sides of the rim. These mounting devices are comparatively light and are substantially symmetrical so that after being mounted in position they may, if desired, be left as a part of the permanent wheel equipment for quick application of the tire chains or antiskid devices thereto.

The annular mounting devices are provided with lugs or chain attaching parts 31 which may be riveted into position to the rings, as shown at 32 (Fig. 10). Each of the lugs has a turned or hooked part 33 which is preferably turned toward the axis of the wheel. Any desired number of lugs may be employed. As shown in the drawings, each annular mounting device is provided with six lugs spaced uniformly about the mounting device. The turned or hooked part 33 is provided with a cap 34 which is of an enlarged diameter at its end, as shown at 36. The cap is preferably of rubber or other suitable resilient material so as to be deformable for a purpose which will later appear.

The chains or antiskid devices may be of any suitable type but preferably I provide an antiskid device comprising two cross chains 38 the ends of which are provided with hooked parts 39 adapted to be received in eyes 41 provided in equalizing parts 42. Each of the equalizing parts is provided with a center opening 43 for the reception of a link.

The opening 43 in the equalizing part 42 for the inside of the wheel is adapted to receive links 44 and 45, at least the link 45 of which has an opening 46 of a width less than the largest diameter 36 of the resilient cap of the lug. However, by deforming the resilient end of the lug, the link may be forced over the end and locked beneath the enlarged part, in which position it will be retained both when the wheel is rotating and when it is not rotating.

The opening 43 in the equalizing part 42 for the outer side of the wheel, is adapted to receive a link 48 which has an opening 49 which is larger at one end, as shown at 51, and smaller or narrower at the other end, as shown at 52. This arrangement enables the link 48 to be slipped over the end of the lug by registering the enlarged opening 51 with the resilient end of the lug, as shown in Fig. 6.

Preferably the chains are attached after the annular mounting devices are in position on the rim by slipping the link 45 over the retaining lug on the inside of the wheel. The chains are then pulled over transversely of the tire until the enlarged part 51 of the link 48 is in registry with the lug. This link is then slipped over the lug, as shown in Fig. 6, and the chain is locked in position.

Any desired number of cross chain assemblies may be employed. In the particular arrangement shown, I have illustrated a set of six lugs on each side of the wheel thus providing for the reception of six chain assemblies enabling the use of twelve transverse chains. Moreover, the mounting device of my invention is suitable for use with antiskid devices other than chains.

One of the particular advantages of the mounting device of my invention is that the cross chain assemblies may be mounted on the tires in a very few minutes and when the vehicle is stuck in deep mud or snow the cross chains are placed on the uppermost part of the tires and the wheels turned until the tires are positioned for mounting the remainder of the cross chains. Moreover, a continuous chain of, for example, the weed type may also be mounted or the vehicle may obtain traction, when deep mud or snow conditions are encountered, by attaching the ends of the chain to the lugs with the remainder of the chain extending to the rear of the vehicle. When power is applied to the vehicle, the chain will wrap itself around the tire to give traction or the remainder of the chain may be applied to the lugs.

It will be apparent that I have provided chain mounting devices which may be quickly placed in position and, if desired, left as a permanent part of the wheel equipment and that tire chains and other antiskid devices may be quickly mounted on the lugs without the necessity of using any tools or employing extensive physical effort to secure the chains.

I claim:

1. In a wheel having a rim adapted to receive a tire and provided with a surface facing toward the center of the wheel at least on one side of the rim, an element having members attached thereto adapted to receive anti-skid devices extending around the tire, said element being formed of separate parts, and means between said parts for expanding said element against said surface into holding relation therewith.

2. In a wheel having a rim adapted to receive a tire and provided with a surface facing toward the center of the wheel at least on one side of the rim, an element having members attached thereto adapted to receive anti-skid devices extending around the tire, said element being annular and having at least one point of separation and means adjacent said point of separation for changing the diameter of said element so as to tighten said element against and in holding relation with said flange.

3. In a wheel having a rim adapted to receive a tire and provided with a surface facing toward the center of the wheel at least on one side of the rim, an element having members attached thereto adapted to receive anti-skid devices extending around the tire, said element being annular and having at least one point of separation forming ends, and means adjacent said point of separation and acting upon said ends for increasing the diameter of said element so as to expand said element into the internal wall of said flange in holding relation therewith.

4. In a wheel having a rim adapted to receive a tire and provided with annular flanges at least on one side of the rim, an element having members attached thereto adapted to receive anti-skid devices extending around the tire, said element being annular and having at least one point of separation, means adjacent said point of separation for changing the diameter of said element so as to tighten said element against and in holding relation with said flange, each of said members having a part turned toward the center of the wheel, means for attaching the anti-skid device on one side of the rim, said anti-skid device having a link adapted to hooked over the turned part of one of said members.

5. In a wheel having a rim adapted to receive a tire and provided with an annular flange at least on one side of the rim, an element having members projecting therefrom adapted to receive anti-skid devices extending around the tire, said element being annular and being made up of two separate substantially semi-circular halves forming two pairs of ends, and means between each pair of ends for forcibly spreading the ends apart and expanding said element into tight holding relation with said flange.

6. In a wheel having a rim adapted to receive a tire and provided with an annular flange at least on one side of the rim, an element having members projecting therefrom adapted to receive anti-skid devices extending around the tire, said element being annular and being made up of two separate substantially semi-circular halves forming two pairs of ends, and means between each pair of ends for forcibly spreading the ends apart and expanding said element into tight holding relation with said flange, each of said members having an enlarged head adapted to receive the end of said anti-skid device.

JOHN G. FOGARTY.

REFERENCES CITED

The following references are of record in the file of this patent:

UNITED STATES PATENTS

| Number | Name | Date |
|---|---|---|
| 829,147 | Gardner | Aug. 21, 1906 |
| 1,091,437 | McDonald | Mar. 24, 1914 |
| 1,237,369 | Murray | Aug. 21, 1917 |
| 1,319,566 | Cottun | Oct. 21, 1919 |
| 1,478,059 | Pye | Dec. 18, 1923 |
| 1,537,592 | DuVall | May 12, 1925 |
| 1,835,659 | Madison | Dec. 8, 1931 |
| 2,348,256 | Hollis | May 9, 1944 |